United States Patent [19]
Bauman

[11] 3,747,629
[45] July 24, 1973

[54] CONVERTIBLE FLUID PRESSURE REGULATOR

[75] Inventor: Patrick S. Bauman, Auburn, Ind.

[73] Assignee: Essex International, Inc., Fort Wayne, Ind.

[22] Filed: June 28, 1972

[21] Appl. No.: 267,118

[52] U.S. Cl............. 137/270, 137/505, 137/505.41
[51] Int. Cl............................................ F16k 31/12
[58] Field of Search.................... 137/269, 270, 505, 137/505.41, 505.42, 63 R, 64 R

[56] References Cited
UNITED STATES PATENTS

| | | | |
|---|---|---|---|
| 2,478,040 | 8/1949 | Campbell | 137/505.42 |
| 2,760,507 | 8/1956 | Miller | 137/63 R |
| 2,871,879 | 2/1959 | Downe | 137/505.41 X |
| 3,405,927 | 10/1968 | Drabik | 137/505.41 X |
| 3,502,096 | 3/1970 | Clay | 137/270 |

FOREIGN PATENTS OR APPLICATIONS

| | | | |
|---|---|---|---|
| 1,058,401 | 11/1953 | France | 137/505.42 |

Primary Examiner—Harold W. Weakley
Attorney—Harold B. Hood, Robert G. Irish et al.

[57] ABSTRACT

A convertible fluid pressure regulator employing a flexible diaphragm valve operator and two springs, one of which biases the diaphragm at all times for regulating a fluid having a first pressure, such as natural gas, and the other of which additionally biases the diaphragm at selected times for regulating another fluid having a second, higher pressure, such as liquefied petroleum gas. A conversion member has a first position removeably seated in an opening in the regulator casing with a projection on the member acting on the second spring thereby to bias the diaphragm with additional force for regulating the higher pressure fluid. The conversion member also has a second, reversed position removeably seated in the casing opening with the projection disengaged from the second spring thereby rendering the same inactive so that the first spring alone biases the diaphragm for regulating the lower pressure fluid.

10 Claims, 2 Drawing Figures

PATENTED JUL 24 1973

3,747,629

CONVERTIBLE FLUID PRESSURE REGULATOR

BACKGROUND OF THE INVENTION

1. Field of the Invention

This invention relates generally to diaphragm-operated fluid pressure regulators, and more particularly to a convertible fluid pressure regulator adapted to regulate fluids at two different pressures, such as natural gas and liquefied petroleum gas.

2. Description of the Prior Art

Pressure regulator valves are commonly used to control the pressure of gas supplied to gas-fired appliances, such as ranges, water heaters, furnaces and the like. One common type of pressure regulator employs a modulating valve controlled by a diaphragm responsive to fluid pressure, the diaphragm being biased by a spring which opposes the force exerted by the pressurized fluid and thus controls the action of the diaphragm.

Two types of gas are commonly used, i.e., natural gas and liquefied petroleum gas. Natural gas is commonly supplied at a much lower pressure than liquefied petroleum gas and thus, it is necessary to employ a different regulator for each type of gas or to provide a regulator which is convertible for use with either type. One form of convertible fluid pressure regulator employes two diaphragm-biasing springs, one spring alone being used for natural gas operation and both being used for liquefied petroleum gas operation; such dual-spring regulators are shown for example in U.S. Pat. Nos. 3,338,264 to T. J. Dykzeul et al, 3,451,421 to R. L. Vicenzi et al, 3,572,219 to D. K. Murrell et al and 3,128,086 to F. T. Wolfhope.

While the regulators desclosed in the above-mentioned patents permit field conversion from one type of gas to the other, they also permit user-adjustment of the spring force, a feature which may not be desirable. It is therefore desirable to provide a convertible fluid pressure regulator which not only is readily convertible for use with either type of gas, but in which the spring force for each type of gas may be preset accurately by the manufacturer thus permitting field conversion from one preset outlet pressure for one type of gas to a different pre-set outlet pressure for a different type of gas.

SUMMARY OF THE INVENTION

The invention, in its broader aspects, provides a convertible fluid pressure regulator for selectively regulating fluid at two different pressures which includes a casing having a chamber therein and inlet and outlet ports communicating with the chamber, valve means for controlling fluid flow between the ports, and a flexible diaphragm in the casing and connected to the valve means for operating the same in response to pressure changes in the chamber. A convertible spring loading assembly is provided for the diaphragm comprising first spring means acting at all times on the diaphragm for biasing the same against pressure exerted thereon with a first force thereby to regulate a first pressure, and second spring means acting on the diaphragm at selected times for biasing the same against the pressure exerted thereon with an additional force thereby to regulate a second pressure higher than the first pressure. The casing has an opening therein and a conversion member is provided having a first position removeably seated in the casing opening with a portion of the member acting on the second spring means thereby biasing the diaphragm with the additional force, the conversion member having a second, reversed position removeably seated in the casing opening with the portion thereof disengaged from the second spring means thereby rendering the same inactive.

It is accordingly an object of the present invention to provide an improved convertible fluid pressure regulator.

Another object of the invention is to provide an improved convertible pressure regulator of the dual-spring type.

A further object of the invention is to provide an improved dual-spring, convertible pressure regulator wherein the forces exerted by both springs may be pre-set.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
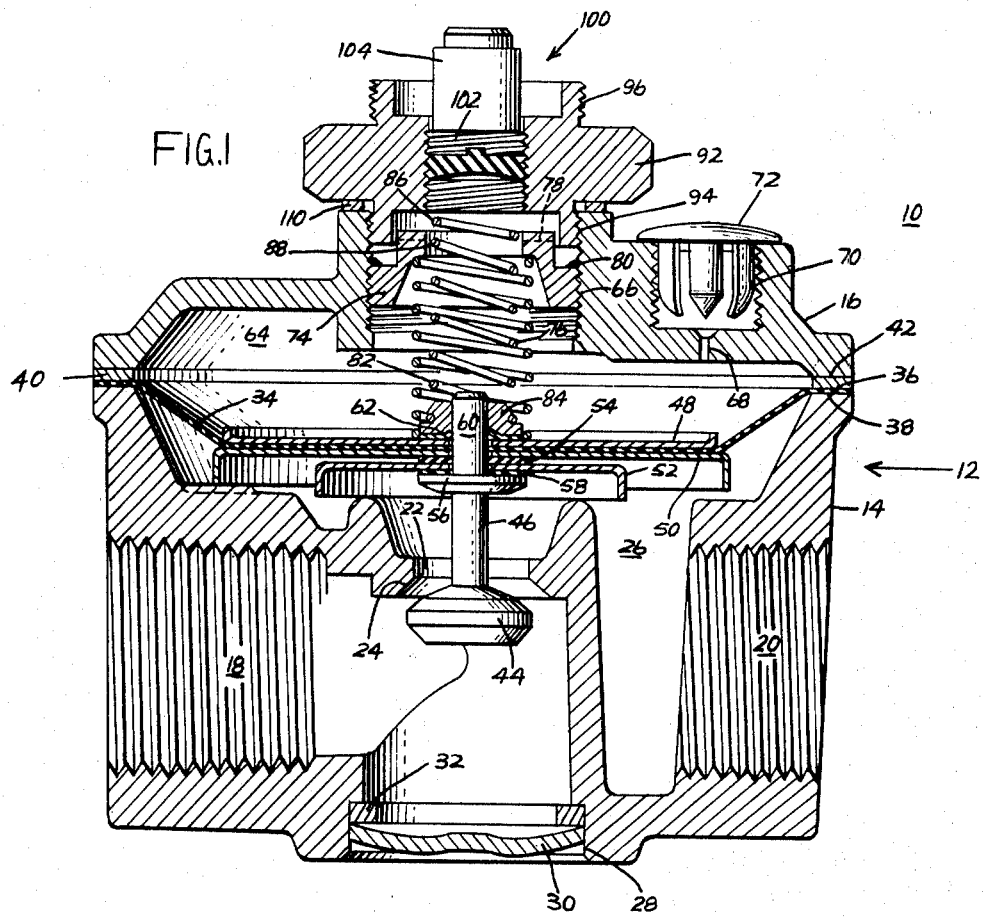
FIG. 1 is a cross-sectional view of the convertible pressure regulator of the invention arranged for natural gas regulation.

Referring now to the drawing, the improved convertible fluid pressure regulator of the invention, generally indicated at 10, incudes casing 12 comprising body 14 and cover 16. Inlet port 18 and outlet port 20 are formed in body 14, ports 18 and 20 being connected by passage 22 surrounded by valve seat 24. Passage 22 and outlet port 20 communicate with chamber 26. Opening 28 in body 14 is provided to permit machining passage 22 and valve seat 24, and is sealed by snap-disc 30 engaging washer 32.

Flexible diaphragm 34 is provided having its peripheral edge 36 sealingly clamped against edge 38 of body 14 by washer 40 engaged by edge 42 of cover 16. Body 14, diaphragm 34, washer 40 and cover 16 are held in assembled relation by conventional thru-bolts (not shown).

Valve element 44 for controlling the flow of fluid from inlet port 18 through passage 22 to outlet port 20 is provided mounted on valve stem 46. Disc-shaped members 48, 50 engage opposite sides of diaphragm 34. Disc-shaped member 52 is spaced from disc-shaped member 50 by washer 54. Valve stem 46 has flange 56 thereon engaging washer 58 which, in turn, engages disc-shaped member 52. Upper end 60 of valve stem 46 extends through openings in disc-shaped members 48, 50 and 52, washers 54 and 58, and diaphragm 34. End 60 of valve stem 46 is sealingly clamped to diaphragm 34 by snap ring 62 which clamps the assembly together thus preventing leakage of gas from chamber 26 past end 60 of valve stem 46.

It can now be seen that flexible diaphragm 34 forms one wall of chamber 26 and that diaphragm 34 operates valve element 44 in response to changes in fluid pressure in chamber 26.

Cover 16 defines second chamber 64 with the other side of diaphragm 34. Threaded opening 66 is provided in cover 16 communicating with chamber 64 and in alignment with valve stem 46. Vent 68 is formed in cover 16 extending between chamber 64 and threaded opening 70 which is covered by snap-in dust cover 72.

The regulator construction thus far described is conventional and does not form a part of the present invention.

In accordance with the invention, spring seat member 74 is threadedly seated in opening 66 in cover 16. First coil spring 76 acts between spring seat member 74 and cup-shaped member 48 thus biasing diaphragm 34 with a first force against the fluid pressure in chamber 26. Screwdriver slot 78 in spring seat member 74 permits initial adjustment of the spring force exerted by spring 76. When the desired setting for spring 76 has been obtained by screw-adjustment of spring seat member 74, member 74 is sealed against further adjustment by suitable sealant 80, such as epoxy.

A second coil spring 82 is provided within spring 76 having its lower end engaging spring seat member 84 mounted on upper end 60 of valve stem 46. In the natural gas conversion of the regulator 10, upper end 86 of spring 82 exends upwardly through central opening 88 in spring seat member 74, spring 82 being uncompressed in this conversion so that spring 76 alone biases diaphragm 34.

Conversion member 92 is provided having external threads 94, 96 at its opposite ends and threaded opening 98 therethrough. Plug member 100 is provided having end 102 threadedly seated in opening 98 in conversion member 92 and having its end 104 extending outwardly beyond end 96. In the natural gas conversion of regulator 10, conversion member 92 has end 94 threadedly seated in opening 66 in cover 16 with end 104 of plug member 100 extending outwardly away from cover 16, as shown in FIG. 1.

Figure 2:
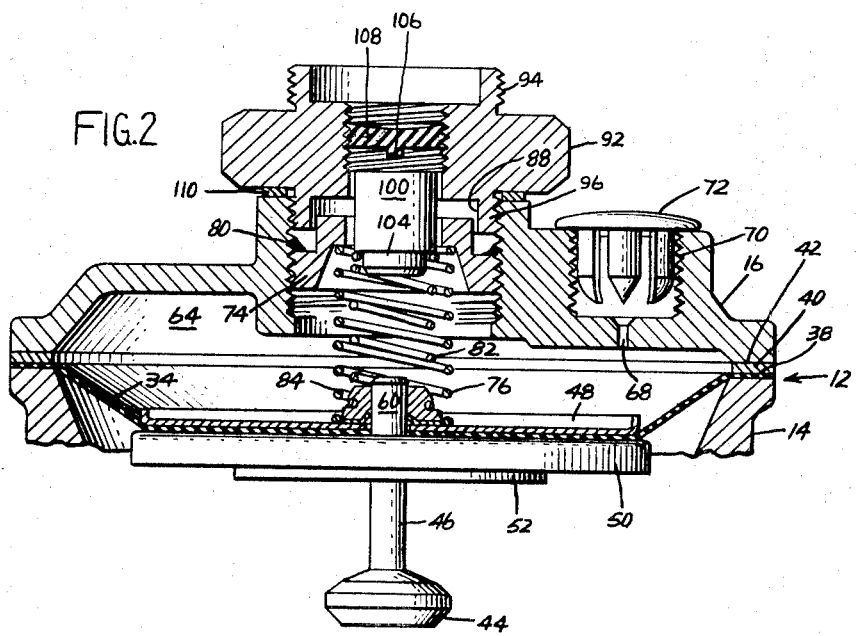
FIG. 2 is a fragmentary cross-sectional view showing the regulator converted for liquefied petroleum gas regulation.

Referring additionally to FIG. 2, in the liquefied petroleum gas conversion of regulator 10, conversion member 92 is reversed ith its end 96 threadedly seated in opening 66 in cover 16. In this position of conversion member 92, end 104 of plug member 100 extends through opening 88 in spring seat member 74 and engages spring 82 thus compressing the same to exert additional biasing force on diaphragm 34. Threaded end 102 of plug member 100 has screwsdriver slot 106 therein to permit initial adjustment of the desired setting of spring 82. Once the desired setting has been obtained, plug member 100 is sealed against further adjustment by suitable sealant 108, such as epoxy.

It will now be seen that for natural gas regulation, conversion member 96 is threaded into opening 66 in cover 16 against washer 110 with plug member 100 extending outwardly as shown in FIG. 1 thereby rendering spring 82 inactive so that spring 76 alone supplies biasing force to diaphragm 34. It will be seen that once spring seat member 74 is factory-adjusted to provide the desired spring setting for natural gas operation, the same spring setting will be provided each time conversion member 92 is thereafter in the position shown in FIG. 1.

It will further be seen that regulator 10 is conveniently converted for liquefied petroleum gas operation by merely unscrewing conversion member 92, reversing it, and again assembling it in opening 96 with end 104 of plug member 100 now compressing spring 82 to provide additional biasing force on diaphragm 34. Again, once plug member 100 has been factory-adjusted to provide the desired setting for spring 82, thereafter the same setting will be provided each time conversion member 92 is positioned as shown in FIG. 2.

While there have been described above the principles of this invention in connection with specific apparatus, it is to be clearly understood that this description is made only by way of example and not as a limitation to the scope of the invention.

What is claimed is:

1. In a convertible fluid pressure regulator for selectively regulating fluids at two different pressures and including a casing having a chamber therein and inlet and outlet ports communicating with said chamber, valve means for controlling fluid flow between said ports, a flexible diaphragm in said casing and connected to said valve means for operating the same in response to pressure changes in said chamber, and a convertible spring loading assembly for said diaphragm comprising first spring means acting at all times on said diaphragm for biasing the same against the pressure exerted thereon with a first force thereby to regulate a first pressure, second spring means acting on said diaphragm at selected times for biasing the same against the pressure exerted thereon with an additional force thereby to regulate a second pressure higher than said first pressure, the improvement wherein said casing has an opening therein, said assembly further comprises a conversion member having a first position removeably seated in said casing opening with a portion of said member acting on said second spring means thereby biasing said diaphragm with said additional force, said conversion member having a second, reversed position removeably seated in said casing opening with said portion disengaged from said second spring means thereby rendering the same inactive.

2. The regulator of claim 1 wherein said conversion member portion comprises a projection thereon, said projection extending into said casing opening in said first position of said conversion member, said projection extending outwardly away from said casing in said second position of said conversion member.

3. The regulator of claim 2 wherein said projection comprises a plug member threadedly seated in an opening in said conversion member thereby to provide selective adjustment of said additional force in said first position of said conversion member.

4. The regulator of claim 3 wherein said plug member is secured in said conversion member opening thereby to apply the same predetermined additional force on said diaphragm whenever said conversion member is in said first position.

5. The regulator of claim 1 wherein said conversion member is threadedly seated in said casing opening.

6. The regulator of claim 1 wherein said assembly further comprises a spring seat member seated in said casing opening and acting on said first spring, said spring seat member having clearance therein for accommodating at least one said second spring means and conversion member portion.

7. The regulator of claim 6 wherein said spring seat member is threadedly seated in said casing opening thereby to provide selective adjustment of said first force.

8. The regulator of claim 7 wherein said spring seat member is secured in said casing opening thereby to apply a predetermined first force on said diaphragm.

9. The regulator of claim 1 wherein said first and second spring means are coil springs, said first spring surrounding said second spring, said assembly further comprising a spring seat member threadedly seated in said casing opening and acting on said first spring thereby to provide selective adjustment of said first force, said conversion member portion comprising a plug member threadedly seated in an opening in said conversion member thereby to provide selective adjustment of said additional force in said first position of said conversion member, said plug member extending into said casing opening in said first position of said conversion member and extending outwardly away from said casing in said second position thereof, said spring seat member having an opening therein for accommodating at least one of said second spring and plug member, said conversion member being threadedly seated in said casing opening.

10. The regulator of claim 9 wherein said plug member is secured in said conversion member opening thereby to apply the same predetermined additional force on said diaphragm whenever said conversion member is in said first position, said spring seat member being secured in said casing opening thereby to apply a predetermined first force on said diaphragm.

* * * * *